United States Patent [19]

Gailberger et al.

[11] Patent Number: 5,691,053

[45] Date of Patent: Nov. 25, 1997

[54] COATING COMPOSITION WITH THERMALLY-INFLUENCED COLOR

[75] Inventors: Michael Gailberger; Anne Barth, both of Neu-Ulm; Hans Ruetger Kricheldorf, Hamburg; Volkmar Vill, Hamburg; Mihai Gurau, Hamburg; Matthias Berghahn, Hamburg, all of Germany

[73] Assignee: Daimler-Benz AG, Stuttgart, Germany

[21] Appl. No.: 441,686

[22] Filed: May 15, 1995

[30] Foreign Application Priority Data

May 13, 1994 [DE] Germany .................... 44 16 993.0

[51] Int. Cl.$^6$ ............................................. B32B 19/00
[52] U.S. Cl. ............. 428/357; 528/272; 528/300; 528/306; 428/480; 522/104
[58] Field of Search ..................... 528/272, 300, 528/306; 428/357, 480; 522/104

[56] References Cited

U.S. PATENT DOCUMENTS

| | | | |
|---|---|---|---|
| 5,242,617 | 9/1993 | Metzger et al. | 252/299.5 |
| 5,256,761 | 10/1993 | Bount, Jr. | 528/272 |
| 5,362,315 | 11/1994 | Mueller-Rees et al. | 106/493 |

FOREIGN PATENT DOCUMENTS

| | | |
|---|---|---|
| 303258 | 2/1989 | European Pat. Off. . |
| 545235 | 6/1993 | European Pat. Off. . |
| 54-73355 | 5/1979 | Japan . |
| 62-20350 A | 9/1994 | Japan . |
| 07228839 | 8/1995 | Japan . |

OTHER PUBLICATIONS

Abstract of Published German Patent Application No. DE 2,849,537.
D. Makow, "Color Gamut of Liquid Crystal Polysiloxanes", *Mol. Cryst. Liq. Cryst.*, 1985, vol. 123, pp. 347–353.

*Primary Examiner*—Samuel A. Acquah
*Attorney, Agent, or Firm*—Evenson, McKeown, Edwards & Lenahan P.L.L.C.

[57] ABSTRACT

A coating material and coating process for color coating articles, such as motor vehicle bodies, and coated articles produced therewith. The coating contains a paint vehicle composed of at least one curable liquid-crystal polymer (LCP), the colored appearance of the coating being determined by mesogens of the paint vehicle which exhibit an interference effect, the mesogens automatically aligning themselves substantially perpendicular to the surface of the article during application of the coating material and adopting a chiral-nematic configuration in which they form a helix having a pitch length which can be influenced by heat within a specified temperature range. The liquid-crystal polymers are such that they are not crosslinked by heat and also such that the temperature level at which the pitch length of the helix can be influenced is above the temperature at which the color coated article is used. By heating an applied but uncrosslinked coating to a temperature within the specified range, the color of the coating can be adjusted in situ to obtain a desired interference color effect after the coating has been applied to the article, and the heat-adjusted color effect can thereafter be stabilized by rapid cooling and/or by UV irradiation of the coat. The color-determining substance of the paint vehicle and the essential substance of the paint vehicle itself are identical and form a coherent homogeneous layer of a cured liquid-crystal polymer.

3 Claims, 5 Drawing Sheets

| DICARBOXYLIC ACID | DIOL | YIELD | VISCOSITY $\eta_{in}$ | DSC MEASUREMENTS | | | EMPIRICAL FORMULA (Formula wt.) | ELEMENTAL ANALYSIS (%) | | | |
|---|---|---|---|---|---|---|---|---|---|---|---|
| | | | | $T_g$ | $T_m$ | $T_i$ | | C | H | N | S |
| -OC-⌬(CO)(CO)-⌬-CH=CH-CO- | -O-⌬-S∼O- | 82% | 0.24 dl/g | 103°C | n.c. | >300°C (decomp.) | $C_{27}H_{10}NO_6S$ (485.51) | calc. 66.8 3.9 2.9 6.6 found 65.7 4.1 3.1 6.2 | | | |
| -OC-⌬(CO)(CO)-⌬-CH=CH-CO- | (-O-⌬-S∼O-)$_{0.50}$ (-O-⌬-S-CH$_3$-O-)$_{0.50}$ | 87% | 0.25 dl/g | 100°C | n.c. | >300°C (decomp.) | $C_{65}H_{40}N_2O_{12}S_2$ (985.05) | calc. 67.0 4.1 2.8 6.5 found 66.0 4.2 3.1 6.0 | | | |
| -OC-⌬(CO)(CO)-⌬-CH=CH-CO- | (-O-⌬-S∼O-)$_{0.20}$ (-O-⌬-S-CH$_3$-O-)$_{0.80}$ | 87% | 0.23 dl/g | 100°C | n.c. | >300°C (decomp.) | $C_{139}H_{03}N_5O_{30}S_6$ (2483.66) | calc. 67.2 4.0 2.7 6.2 found 66.1 4.3 3.2 6.0 | | | |
| -OC-⌬(CO)(CO)-⌬-CH=CH-CO- | -O-⌬-S-CH$_3$-O- | 78% | 0.20 dl/g | 99°C | n.c. | >300°C (decomp.) | $C_{28}H_{21}NO_6S$ (499.54) | calc. 67.3 4.2 2.8 6.4 found 66.6 4.3 3.4 6.4 | | | |

| DICARBOXYLIC ACID | DIOL | YIELD | VISCOSITY $\eta_{in}$ | DSC MEASUREMENTS $T_g$ $T_m$ $T_i$ | EMPIRICAL FORMULA (Formula wt.) | ELEMENTAL ANALYSIS (%) C H N S |
|---|---|---|---|---|---|---|
| -OC-⌬-CH=CH-CO- (phthaloyl) | -O-⌬-S~O- | 82% | 0.24 dl/g | 103°C  n.c.  >300°C (decomp.) | $C_{27}H_{10}NO_6S$ (485.51) | calc. 66.8 3.9 2.9 6.6  found 65.7 4.1 3.1 6.2 |
| -OC-⌬-CH=CH-CO- | (-O-⌬-S~O-)$_{0.50}$ / (-O-⌬-S-CH(CH₃)-*-O-)$_{0.50}$ | 87% | 0.25 dl/g | 100°C  n.c.  >300°C (decomp.) | $C_{65}H_{40}N_2O_{12}S_2$ (985.05) | calc. 67.0 4.1 2.8 6.5  found 66.0 4.2 3.1 6.0 |
| -OC-⌬-CH=CH-CO- | (-O-⌬-S~O-)$_{0.20}$ / (-O-⌬-S-CH(CH₃)-*-O-)$_{0.80}$ | 87% | 0.23 dl/g | 100°C  n.c.  >300°C (decomp.) | $C_{139}H_{03}N_5O_{30}S_6$ (2483.66) | calc. 67.2 4.0 2.7 6.2  found 66.1 4.3 3.2 6.0 |
| -OC-⌬-CH=CH-CO- | -O-⌬-S-CH(CH₃)-*-O- | 78% | 0.20 dl/g | 99°C  n.c.  >300°C (decomp.) | $C_{28}H_{21}NO_6S$ (499.54) | calc. 67.3 4.2 2.8 6.4  found 66.6 4.3 3.4 6.4 |

FIG. 1

| POLYMER (No.) | VARIANT | YIELD (%) | $\eta_{in.}$ (dl/g) | $(\alpha)^{20}_D$ (°) | EMPIRICAL FORMULA (formula weight) | ELEMENTAL ANALYSIS (%) | | | | |
|---|---|---|---|---|---|---|---|---|---|---|
| | | | | | | | C | H | N | S |
| 1 | A | 92 | 0.62 | −46.37 | $C_{20}H_{18}O_4S$ (354.42) | calc. found | 67.78 67.94 | 5.12 5.08 | — — | 9.04 9.01 |
| 2 | A | 85 | 0.44 | −51.02 | $C_{218}H_{130}O_{40}S_{10}$ (3760.40) | calc. found | 69.63 69.03 | 4.83 4.67 | — — | 8.53 8.46 |
| 3 | A | 82 | 0.56 | −48.71 | $C_{42}H_{36}O_8S_2$ (732.86) | calc. found | 68.83 69.04 | 4.95 4.86 | — — | 8.75 8.83 |
| 4 | A | 95 | 0.59 | −48.93 | $C_{42}H_{36}O_8S_2$ (732.86) | calc. found | 68.83 68.73 | 4.95 4.87 | — — | 8.75 8.68 |
| 5 | B | 78 | 0.20 | −27.29 | $C_{23}H_{21}NO_6S$ (499.54) | calc. found | 67.32 | 4.24 | 2.80 | 6.42 |
| 6 | B | 75 | 0.13 | −0.74⁴¹ | $C_{24}H_{21}NO_6S$ (451.49) | calc. found | 63.85 63.07 | 4.69 4.73 | 3.10 3.00 | 7.10 7.25 |

FIG. 2

COATING COMPOSITION WITH THERMALLY-INFLUENCED COLOR

BACKGROUND OF THE INVENTION

This invention relates to a colored coating material comprising a paint vehicle containing a color imparting substance for coating utility articles, especially motor vehicle bodies; to a colored article, for example a motor vehicle body, coated with at least one coating layer, and preferably with a plurality of layers, which comprises a paint vehicle containing a substance which imparts a desired color to the coated article; and to a process for color-coating utility articles, for example motor vehicle bodies, in which a color-determining layer is applied to the surface of the article in a desired layer thickness and subsequently cured.

Conventional coating materials and applied coatings comprise color-imparting pigments incorporated in a clear paint vehicle, the pigments generally being absorption pigments which absorb all frequencies of visible light except for a narrow band of the spectrum which corresponds to the inherent color. In addition, there are also effect coating materials, in which the pigments consist of flakes with a metallic luster or of small platelets with a pearl luster coating. U.S. Pat. No. 5,242,617 (=EP 383,376) describes such an effect coating material, in which small mica platelets are coated uniformly on all faces with a crosslinked, liquid-crystal polymer (LCP) in chiral-nematic configuration. The colored appearance of such pigments is caused by an interference phenomenon. The only light waves of the incident light which are reflected are those whose wavelength results in interference with the equidistant interplanar spacings of the liquid-crystal polymers, while the fractions of light of other wavelengths pass through the clear paint vehicle and are absorbed by the substrate, which is preferably dark in color. Platelet-like interference pigments of this kind, aligned parallel to the coated surface, have when viewed orthogonally a defined first color—base color—and, from an inclined viewing direction, have a second, shorter-wave color. This viewing angle-dependent colored appearance of the coated surface gives the coating very great effect and makes it highly desirable for certain applications in which such color effects are regarded positively by the customer. Disadvantages include not only the complex preparation of the interference pigments, but also the fact that a different pigment is required for every desired base color of the coating material. As a result, the effect coating material is configured in a broad range of colors and, accordingly, the effect coating on the utility article becomes very costly.

One condition for the occurrence of liquid- crystalline phases is a rigid mesogenic molecular configuration. The repeating units of liquid-crystalline polymers comprise the mesogenic units. The two most frequently realized molecular structures are the side-chain LC polymers, in which the mesogenic units are attached chemically as side chains of the polymer backbone, and the main-chain LC polymers, in which the mesogenic units form the polymer backbone or part of the polymer backbone. In addition to the homopolymers, a large number of copolymers can be prepared which may comprise different mesogenic units or nonmesogenic and mesogenic units.

Examined European Patent Application No. EP 303,258 describes a process for powder coating a metal substrate in which the protective coating is intended to be resistant and to exhibit mechanically firm adhesion to the substrate. The protective coating is formed from a powdered high-melting copolymer with specific units—terephthalic acid derivatives—in the main chain and with two specific side chains—phenyl-substituted hydroquinones. For the liquid melt phase of the copolymer in the range from 330° to 365° C. specific viscosity data and other rheological data are given. Moreover, in the liquid state the copolymer has optically anisotropic properties. In one advantageous embodiment the copolymer is required to have a liquid-crystalline property. The powdered copolymer is fused onto the preheated metal substrate, preferably in a layer thickness of about 75 µm. The metal substrate with the coating is then quenched, for example in water.

SUMMARY OF THE INVENTION

It is the object of the invention to provide an improved coating material for producing effect coatings.

It is also an object of the invention to provide improved effect coatings.

Another object of the invention is to provide effect coatings and coating materials for producing effect coatings in all possible colors of the range of colors.

A further object of the invention is to provide effect coatings and coating materials for producing effect coatings which can be manufactured in a simple manner.

An additional object of the invention is to provide effect coatings and coating materials for producing effect coatings which can be produced in an economical manner.

These and other objects of the invention are achieved by providing a colored coating material comprising a paint vehicle for coating articles, the paint vehicle comprising at least one curable liquid-crystal polymer having a colored appearance at least partially determined by mesogens therein which exhibit an interference effect, the mesogens being uncrosslinked when the coating material is applied to an article surface and upon application to the article surface automatically aligning themselves approximately perpendicular to the surface and adopting a chiral-nematic configuration in which they form helixes having a pitch length which can be influenced by heat, the at least one liquid-crystal polymer being such that it is not crosslinkable by heat and such that the pitch length of the helix is influenced by heat only at a temperature above the temperature at which the article to which it is applied is used.

In accordance with a further aspect of the invention the objects are achieved by providing a colored article comprising a body having a surface coated with at least one coherent, homogeneous, color-determining coating layer comprising at least one cured liquid-crystal polymer material which both forms the coating and determines the color thereof, the color being determined at least partially by mesogens in the polymer, the mesogens exhibiting an interference effect and being aligned approximately perpendicular to the surface of the article, the mesogens further having a chiral-nematic configuration and forming a helix having a pitch length which can be influenced by heat, the at least one liquid-crystal polymer being such that it is not crosslinkable by heat and such that the pitch length of the helix is influenced by heat only at a temperature above the temperature at which the article is used.

According to yet another aspect of the invention, the objects are also achieved by providing a process for color-coating an article, the process comprising applying a layer of an uncrosslinked color-determining coating material to a surface of the article and curing the applied coating material, in which a) the color-determining coating material comprises a paint vehicle consisting essentially of at least one curable liquid-crystal polymer comprising mesogens which, when the polymer is applied to a substrate surface, adopt a chiral-nematic configuration and form helixes having a pitch length which can be influenced by heat within a defined temperature range; b) the at least one liquid-crystal polymer is such that it is not crosslinkable by heat and such that the temperature range at which the pitch length of the helixes can be influenced by heat is above the temperature at which the article is used; c) due to a flow movement or shear movement of the coating material upon application to the surface of the article, the mesogens are automatically aligned approximately perpendicular to the surface of the article; d) the applied, uncrosslinked coating is adjusted to a desired color by heating it to a temperature within the defined temperature range at which the pitch length of the helixes of the mesogens of the at least one liquid-crystal polymer produces an interference color effect corresponding to the desired color; and e) the interference color effect is set by subjecting the color-adjusted coating to at least one stabilizing step selected from the group consisting of cooling the coating at a substantially quicker rate than that at which it was heated and subjecting the coating to ultraviolet irradiation, in order to stabilize the pitch length of the helixes.

The present invention accordingly comprises the use of main-chain LC polymers as homogeneous effect coating material in which effect-coating material pigments and paint vehicle are identical. An essential feature in this regard is that the desired effect color is set only after the coating material has been applied to the utility article. All of the colors of the spectrum can be produced from a single coating material or can even be modified subsequently.

The substances which are to be used, or which are suitable, can be hardened or cured without crosslinking and, in this hardened or cured non-crosslinked state, remain capable of being influenced further in their effect color by the action of heat. In addition, the substances are of course also crosslinkable, even photochemically, although this is not essential for the polymers to have good mechanical properties. In the crosslinked state, the effect color of the polymer can no longer be adjusted by the action of heat.

The substances described hereinafter in the following examples form chiral nematic phases. Due to their chemical structure, the main-chain LC polymers belong to the class of high temperature-resistant polymers, which are distinguished by very good mechanical properties such as high rigidity, strength and hardness, which are particularly advantageous when the polymers are used as an exterior paints.

The reflection wavelength of chiral nematic liquid crystals is determined by the pitch length of the helix formed by the mesogenic groups. In the non-crosslinked state, the pitch length of the helix is a function of temperature, so that the reflection color is a temperature indicator. In fact, the helical pitch length is inversely proportional to the absolute temperature of the polymer. Conversely, the temperature can be used to adjust the reflection wavelength of the chiral nematic liquid crystals. Transition to the chiral nematic phase in the present polymers, preferably in the polymer 5 described in the examples, occurs at temperatures which are markedly above the temperature of use (e.g. 170° C.). For example, at this temperature polymer 5 has a red reflection color. Increasing the temperature causes a shift of the reflection color into the shortwave region of the visible spectrum. By precise adjustment of the temperature, it is possible to select any of the reflection wavelengths of the visible spectrum.

The reflection colors can be preserved in an enduring manner by rapid cooling of the coated workpieces. The reflection set in this way only changes when the workpiece is reheated to 170° C. (polymer 5). The process is reversible, so if a coating of the non-crosslinked polymer is reheated, then it is possible to set different reflection wavelengths or to reset the same one as before. If the reflection wavelength is to be preserved permanently, the polymer coat can be crosslinked by irradiation with UV light. The set reflection wavelength then remains stable up to the decomposition temperature of the polymer (e.g. at 300° C. in the case of polymer 5).

The coating material can be applied as a homogenous coating in solution (for example, dissolved in a solvent such as N-methylpyrrolidone or N,N-dimethylformamide), or by knife-coating of the polymer, or as a powder coating in a melt.

The polymers, preferably polymer 5, are oriented by known methods (e.g. knifing, shearing) and particularly well by a polyimide orientation layer, again preferably in the case of polymer 5 since it also contains imide groups.

BRIEF DESCRIPTION OF THE DRAWINGS

The invention will be described in further detail by the following examples of illustrative preferred embodiments with reference in part to the accompanying drawing figures in which:

FIG. 1 shows an overview in table form of four different photocrosslinkable polymers and their properties, which inter alia were considered and investigated in conjunction with the present invention, but only one of which (polymer 5) is discussed in detail;

FIG. 2 shows a further overview in table form of six different polymers which are suitable for the purposes of the present invention;

DETAILED DESCRIPTION OF PREFERRED EMBODIMENTS

Figure 3:
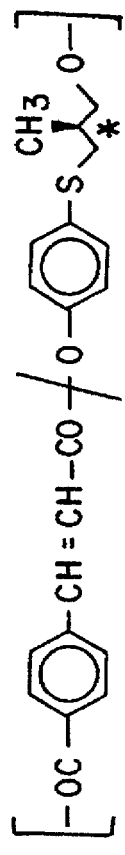
FIGS. 3 through 8 show structural formulas of the six different polymers from the table in FIG. 2.

The individual rows of the table in FIG. 1 list four different polymers each of which was synthesized from a single dicarboxylic acid, the whose structural formula of which is indicated in the first column on the left, and from different diols. Indeed, the synthesis employed different mixtures of two different diols, which are indicated in the second column from the left. One of the two diols employed, referred to below as diol K, comprises a propane radical and contains no asymmetric center or center of chirality. The other of the two diols employed, which may be referred to as diol M, comprises a methyl group at which there is a center of chirality which is indicated in the structural formula by an asterisk (*). The proportion of the two diols in the four different rows was varied. In the example investigated in accordance with the first row of the table the proportions are 100% of diol K and zero percent of diol M. In the examples according to the second and third rows of the table, diol K and diol M are used in proportions of 50:50 and 20:80, respectively. Finally, in the example according to the fourth row of the table, only diol M was employed, and the proportion of diol K in this case was zero. By comparing the four different polymers obtained it can be seen that the higher the proportion of the diol M with a center of chirality used in the synthesis of the polymer, the more suitable the resulting polymer was for the purposes of the present invention. A greater or lesser degree of suitability is indicated on the one hand by the interference effect of the polymer being weaker or stronger and by the interference color being more or less intense. On the other hand, greater or lesser suitability is also demonstrated by the interference colors being capable of being influenced by the action of heat over a wider or narrower range of the color spectrum. Of the polymers listed in the table of FIG. 1, therefore, the polymer listed in the last row of the table is the most suitable. It is this polymer which has been referred to above as polymer 5 and which will be discussed in more detail below.

Inasmuch as the information in the column headings is not self-explanatory, the other columns of the table of FIG. 1 will be discussed briefly for the sake of completeness. The fourth column from the left lists the respective intrinsic viscosity measured under the following conditions: $TFA:CH_2Cl_2/1:9$ with c equal to 2 g/l at 20° C. In the three subcolumns of the fifth column from the left, $T_g$ indicates the glass transition temperature; no information could be given under $T_m$ (melting temperature) because all of the polymers are non-crystalline ("n.c."). Similarly, no isotropic temperature $T_i$ is given here, because the optical anisotropy of the polymers was retained up until their decomposition—indicated by (Z.)—which begins at about 300° C.

The table of FIG. 2 gives an overview of further examples of photocrosslinkable homopolymers and copolymers which are suitable for the purposes of the present invention. The polymers listed in the first four rows of the table, polymers 1 to 4, were synthesized by a method designated as variant A, namely by condensation in solution in a 1:2 (volume) mixture of pyridine:1,2-dichloroethane. Polymers 5 and 6, which are listed in the last two rows of the table, were synthesized by a variant B, namely by condensation in solution in a 2:1 (volume) mixture of N-methylpyrrolidone:pyridine. The third column from the left indicates the obtained yield in percent. Column four from the left again mentions the intrinsic viscosity, measured in a 4:1 (volume) mixture of $CH_2Cl_2$:trifluoroacetic acid with c=2 g/l at 20° C. In the fifth column from the left the optical rotation of the particular polymer is given, which for polymers 2 to 5 was measured in a 4:1 (volume) mixture of $CH_2Cl_2$:trifluoroacetic acid with c=2 g/100 ml at 20° C., while the measurement for polymers 1 and 6 was carried out in $CHCl_3$ with c=2 g/100 ml at 20° C. The information in the columns headed "Empirical formula" and "Elemental analysis" should be clear without further explanation. In the last column the calculated values, designated by "calc.", on the one hand are compared with the respective measured analytical values, designated by "found", on the other.

Figure 8:
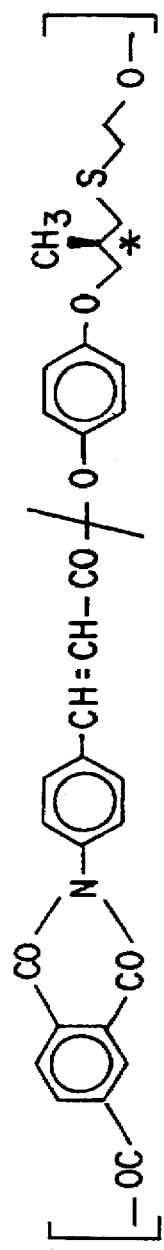

The following table lists additional thermal data for these six different polymers and relates the structural formula to the respective figure. The individual temperature symbols are defined briefly as follows: $T_g$ is the glass transition temperature; $T_{ch}$ is the chiralization temperature, i.e. the temperature at which the molecules, when heated, begin to adopt a chiral nematic configuration; and $T_i$ is the isotropic temperature. The isotropic temperatures specified here for polymers 1 to 5 should correspond approximately to the decomposition temperature of these polymers, because anisotropy was also lost as decomposition begins. The chiralization temperatures were detected only in the first heating curve. From the structural formulae it can be seen that all of the polymers—with the exception of J polymer 6, whose structure is depicted in FIG. 8—are formed with the diol referred to above as diol M. The oblique stroke in the structural representations is intended to indicate the starting materials, the structure of which can be discerned from either side of the oblique stroke, from which the polymers were formed.

Figure 4:
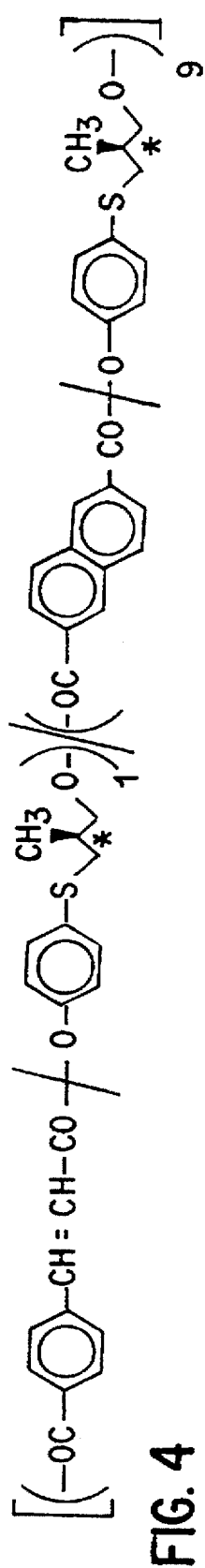
Figure 5:
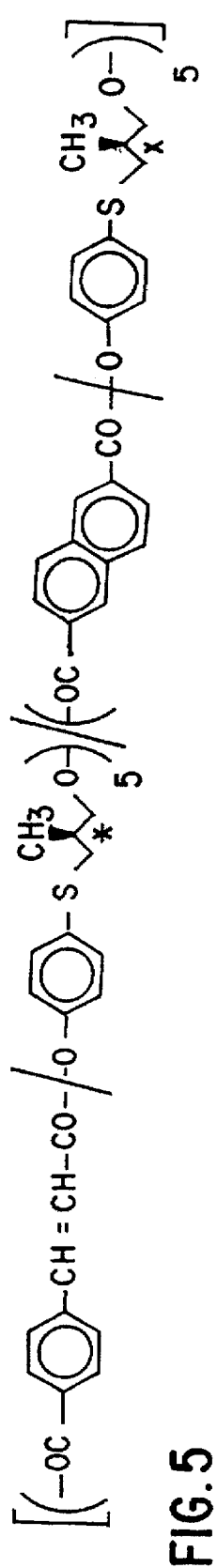
Figure 6:
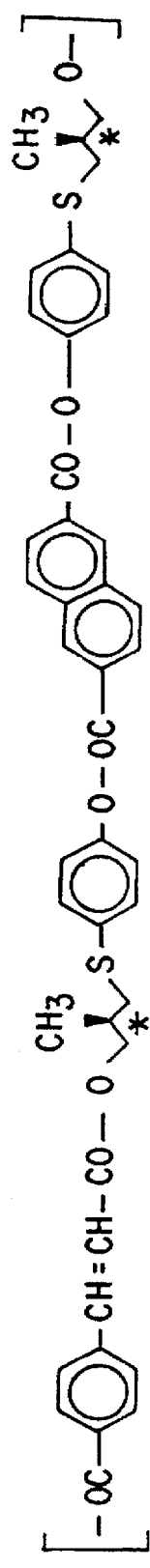
Figure 7:

| Polymer No. | Structural Formula in | DSC Measurement $T_g$ [°C.] | DSC Measurement $T_{ch}$ [°C.] | DSC Measurement $T_i$ [°C.] |
| --- | --- | --- | --- | --- |
| 1 | FIG. 3 | 60 | — | 299 |
| 2 | FIG. 4 | 69 | — | 334 |
| 3 | FIG. 5 | 62 | — | 315 |
| 4 | FIG. 6 | 69 | 170 | 314 |
| 5 | FIG. 7 | 99 | 170 | 338 |
| 6 | FIG. 8 | 68 | 156 | 173 |

The following describes the synthesis of photocrosslinkable polymers 1 to 4 by solution polycondensation starting from 3-(4-chloroformylphenyl)-propenecarbonyl chloride and 2,6-naphthalenedicarbonyl chloride, referred to above also as variant "A".

The respective chiral diol was dissolved in a solvent mixture comprising 20 ml of dry 1,2-dichloroethane and 10 ml of dry pyridine, and the solution was cooled in an ice bath to 0° C. The nature of the respective diol and the quantity required are specified separately below for each of polymers 1 to 4. Following the addition of the respective solid acid chloride or acid chloride mixture, the identity and proportions of which are also indicated below, the mixture was stirred for two hours with ice cooling and nitrogen flushing. The temperature was raised to 60° C., and stirring was continued for six hours. The viscous mixture was cooled to room temperature and stirred into 1 liter of methanol, and the precipitate was filtered out and washed successively with water and acetone. The dry, crude product was dissolved in a 4:1 (volume) mixture of methylene chloride and trifluoroacetic acid, precipitated from cold methanol, and dried in vacuo at 50° C.

Starting materials for polymer 1:
Diol: 18 mmol of (R)-(−)-4-(hydroxyphenyl)-(1-[3-hydroxy-2-methyl]-propyl) sulfide.
Acid chloride: 18 mmol of 3-(4-chloroformylphenyl)-propenecarbonyl chloride.

Starting materials for polymer 2:
Diol: 18 mmol of (R)-(−)-4-(hydroxyphenyl)-(1-[3-hydroxy-2-methyl]-propyl) sulfide.
Acid chloride 1: 1.8 mmol of 3-(4-chloroformylphenyl)-propenecarbonyl chloride.
Acid chloride 2: 16.2 mmol of 2,6-naphthalenedicarbonyl chloride.

Starting materials for polymer 3:
Diol: 18 mmol of (R)-(−)-4-(hydroxyphenyl)-(1-[3-hydroxy-2-methyl]-propyl) sulfide.
Acid chloride 1: 9 mmol of 3-(4-chloroformylphenyl)-propenecarbonyl chloride.
Acid chloride 2: 9 mmol of 2,6-naphthalenedicarbonyl chloride.

Starting materials for polymer 4:
Diol: 9 mmol of (R)-2,6-bis({1-[4-hydroxy-3-methyl-1-thio]-butyl}-4-phenyl) naphthoate.
Acid chloride: 9 mmol of 3-(4-chloroformylphenyl) propene-carbonyl chloride.

The two photocrosslinkable polymers 5 and 6 can be prepared by solution polycondensation starting from N-(4-[2-chloroformyl-ethenyl]-phenyl)-trimellitimide chloride, referred to above as variant "B", by the following procedure: A solution of 15 mmol of the chiral diol—the nature of the particular diol is indicated below for the polymer 5 and, respectively, 6—in 20 ml of dry N-methylpyrrolidone (NMP) and 10 ml of pyridine was cooled in an ice bath to 0° C., 15 mmol of N-(4-[2-chloroformylethenyl]phenyl) trimellitimide chloride were added, and the mixture was stirred at this temperature for two days under nitrogen. The temperature was subsequently raised to 90° C. and stirring was continued for two hours. The mixture was cooled to room temperature and stirred into 500 ml of methanol, and the resulting finely pulverulent precipitate was filtered out and washed with copious amounts of water. The crude product was dried in vacuo at 80° C., dissolved in a 4:1 (volume) mixture of methylene chloride:trifluoroacetic acid, and precipitated in methanol. The polymer was filtered out and dried in vacuo (12 mbar) at 80° C. for two days.

Diol for polymer 5: (S)-(+)-4-(Hydroxyphenyl)-(1-[3-hydroxy-2-methyl]-propyl) sulfide.

Diol for polymer 6: (S)-(+)-(1-[3-Hydroxy-2-methyl]-propyl)-(1-[2-hydroxy]-ethyl)sulfide.

Figure 9:
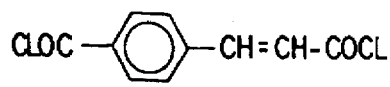
FIGS. 9 through 14 show structural formulas of different starting compounds for preparing the polymers from the table in FIG. 2.

The following text discusses in further detail the chemical preparation of the starting materials for synthesizing polymers 1 to 6. In order to synthesize polymers 1 to 4, a first chloride was required, specifically a 3-(4-chloroformylphenyl)-propenecarbonyl chloride. The structural formula of this chloride is depicted in FIG. 9. This chloride 1 was incorporated into the molecular structure of the specified polymers on the left-hand side of the oblique stroke in the structural representations of FIGS. 3 to 6 with elimination of the chlorine atoms. To chemically prepare this chloride, 1 ml of dimethylformamide was added to a suspension of 18 g (93.67 mmol) of commercially available 3-(4-carboxyphenyl)-propenecarboxylic acid in 125 ml of thionyl chloride, and the mixture was boiled at reflux until no further bubbles evolved. The excess thionyl chloride was distilled off, and the crude product was recrystallized from 60/70 mixture of chloroform/petroleum ether [about 4:1 by volume]. Yield: 17.81 g (77.74 mmol)=83% of the theoretical value. Melting point: 127°–129° C. Chemical Shift Values $^1$H-NMR (CDCl$_3$/TMS): δ (ppm)=6.77 (d, 1H), 7.71 (d, 2H), 7.86 (d, 1H), 8.19 (d, 2H)

| Elemental analysis: [%] | | C | H | Cl |
|---|---|---|---|---|
| C$_{10}$H$_6$O$_2$Cl$_2$ | calc.: | 52.44 | 2.64 | 30.95 |
| (290.062) | found: | 52.18 | 2.56 | 30.68 |

Figure 10:
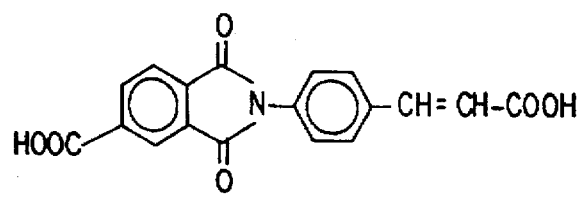

The synthesis of polymers 5 and 6 employs a different chloride, referred to for short below as chloride 2, which was N-(4-[2-chloroformylethenyl]-phenyl) trimellitimide chloride. In turn, this was obtained from a trimellitimide, namely N-(4-[2-carboxyethenyl]phenyl) trimellitimide. The structural formula of this trimellitimide is depicted in FIG. 10. To obtain this trimellitimide in the laboratory, a solution of 50.46 g (0.26 mol) of trimellitic anhydride and 48.50 g (0.24 mol) of 4-aminocinnamic acid hydrochloride in 450 ml of dry dimethylformamide was heated to 100° C.; 22.50 g (0.252 mol) of triethylamine were added, and the mixture was stirred at 120° C. for two hours. 26.95 g (0.263 mol) of acetic anhydride were then added and stirring was continued at 120° C. for one hour. The mixture was cooled to room temperature; 500 ml of diethyl ether were added, and the yellow precipitate was filtered out with suction. The crude product was washed with 250 ml of acetone and 250 ml of diethyl ether and then recrystallized from dioxane. Yield: 43.1 g (0.13 mol)=59% of theoretical. Melting point: >310° C. (decomposition).

Figure 11:
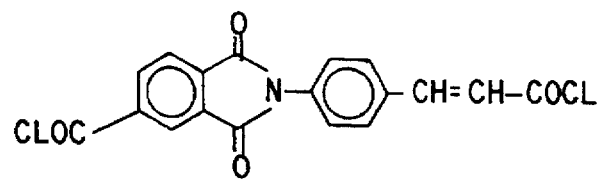

From the trimellitimide prepared in this way it was possible to obtain the chloride which was actually to be employed, namely N-(4-[2-chloroformylethenyl]phenyl)-trimellitimide chloride. The structural formula of this chloride is depicted in FIG. 11. This chloride 2 was incorporated into the molecular structure of the polymers 5 and 6 on the left-hand side of the oblique stroke in the structural representation of FIGS. 7 and 8, respectively, likewise with the loss of the chlorine atoms. In fact, in order to obtain the chloride 2, a suspension of 43.1 g (0.13 mol) of N-(4-[2-carboxyethen-5-yl]-phenyl)-trimellitimide in 200 ml of thionyl chloride and 1 ml of dimethylformamide was boiled under reflux until no further bubbles evolved. Then excess thionyl chloride was distilled off until the acid chloride was still just maintained in solution. The solution, at a temperature of 60° C., was stirred into 1.5 liters of petroleum ether 60/70, and the pale yellow precipitate was filtered out with suction, washed with 500 ml of petroleum ether and dried. Yield: 30.61 g (0.08 mol)=63% of theoretical. Melting point: 213°–215° C. Chemical Shift Values, $^1$H-NMR (CDCl$_3$/TMS): δ (ppm)=6.70 (d, 1H), 7.68 (d, 2M), 7.76 (d, 2H), 7.95 (d, 1H), 8.14 (d, 1H), 8.58 (dd, 1H), 8.72 (d, 1H).

| Elemental analysis: [%] | | C | H | N | Cl |
|---|---|---|---|---|---|
| C$_{18}$H$_9$NO$_4$Cl$_2$ | calc.: | 57.78 | 2.42 | 3.74 | 18.95 |
| (374.179) | found: | 57.79 | 2.56 | 3.64 | 19.01 |

Figure 12:
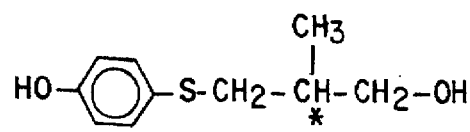

The polymers 1 to 5 contain sulfide groups, which are incorporated into the corresponding polymers on the right-hand side of the, Or of an, oblique stroke in the structural representations of FIGS. 3 to 7, with the elimination of hydrogen atoms. These sulfides, which are employed as starting materials, are 4-(hydroxyphenyl)-(1-[3-hydroxy-2-methyl]-propyl) sulfides, which occur in a dextrorotatory version and in a levorotatory version; they will be referred to below for short as sulfides 1. The corresponding structural formula for these two sulfides, which to this extent is the same for both versions, is shown in FIG. 12. The use of one or the other of these two sulfides is entirely arbitrary, but it should be ensured that only one of the two sulfides is used. In order to chemically prepare these sulfides, a solution of 150 ml of freshly distilled ethanol, 50 ml of demineralized water and 7.48 g (0.19 mol) of sodium hydroxide was saturated with nitrogen for 20 minutes. The oxygen-free solution was admixed with 22 g (0.174 mol) of 4-hydroxythiophenol and with 0.17 mol of (R)-(−)- or (S)-(+)-3-bromo-2-methyl-1-propanol, i.e. in the dextrorotatory or, respectively, in the levorotatory version of this halogen compound, and was stirred at 80° C. for two hours. The mixture was concentrated in vacuo, made up to 500 ml with water, 5 ml of concentrated hydrochloric acid was added, and the mixture was extracted with 1.5 liters of diethyl ether for two days in a rotary perforator. The ethereal phase was then separated and dried over magnesium sulfate, and the solvent was distilled off in a rotary evaporator. The remaining oil was fractionated under a high vacuum (0.005 mbar). After the low molecular weight impurities have been stripped off, the receiver flask must be cooled to −190° C. with liquid nitrogen. The yields for the dextrorotatory and the levorotatory sulfide 1 are different. If the sulfide 1 was obtained in the levorotatory version using the halogen compound (R)-(−)-3-bromo-2-methyl-1-propanol, the yield was 32.70 (0.165 mol), corresponding to 97% of theoretical. The optical rotation [a]$_D^{20}$ of this sulfide was −35 ° (c=2 g/100 ml, CHCl$_3$) with the minus sign indicating levorotation. For the synthesis of the dextrorotatory sulfide 1, the starting halogen compound was (S)-(+)-3-bromo-2-methyl-1-propanol. In this case the yield was 31.69 g (0.160 mol), i.e. 94% of theoretical. The entirely analogous optical rotation $[a]_D^{20}$ of this sulfide was +3.5° (c=2 g/100 ml, CHCl$_3$), with the plus sign indicating dextrorotation. The refractive index $n_D^{20}$ of both versions of the sulfides 1 was 1.5887. The δ values (ppm) for the chemical shift $^1$H-NMR (CDCl$_3$/ TMS) are: 1.02 (d, 3H) , 1.72–2.12 (m, 1H), 2.61–3.08 (m, 2H), 3.64 (d, 2H), 4.00–4.70 (bs, 2), 6.75 (d, 2H), 7.33 (d, 2H)

| Elemental analysis: [%] | | C | H | S |
|---|---|---|---|---|
| C$_{10}$H$_{14}$O$_2$S | calc.: | 60.57 | 7.11 | 16.17 |
| (198.280) | found: | 60.30 | 7.14 | 16.32 |

Figure 13:
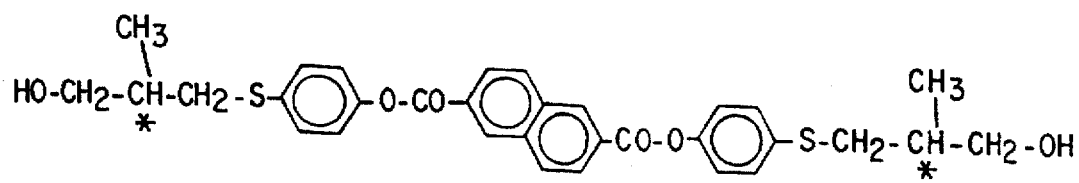

In order to prepare polymer 4 a naphthoate starting compound was employed, namely (R)-(–)-2,6-bis({1-[4-hydroxy-3-methyl-1-thio]-butyl}-4-phenyl) naphthoate. Its structural formula is shown in FIG. 13. This naphthoate was incorporated, with the loss of hydrogen atoms, in that section of the polymer structure of polymer 4 which is on the right-hand side of the oblique stroke in the structural representation according to FIG. 6.

In order to prepare this naphthoate, a suspension of 6.89 g (34.75 mmol) of the sulfide 1 in the levorotatory version, i.e. (R)-(–)-4-(hydroxyphenyl)-(1-[3-hydroxy-2-methyl]-propyl) sulfide in 30 ml of water was freed from oxygen for 20 minutes in a stream of nitrogen. Following the addition of 1.46 g (36 mmol) of sodium hydroxide and 20 mg of TEBA-Cl, the mixture was stirred with the aid of an Ultra-Turrax stirrer until a clear solution developed. Subsequently, a clear solution of 4 g (15.8 mmol) of 2,6-naphthalenedicarbonyl dichloride in 60 ml of dry methylene chloride was added with vigorous stirring (10,000 rpm), and stirring was continued for 10 minutes. The solid which precipitated was filtered out, washed with acetone and recrystallized from a 3:2 (volume) mixture of dioxane:water. Yield: 8.25 g (14.30 mmol)=90% of theoretical. Melting point: 196°–198° C. Optical rotation $[a]_D^{20}$: –17.99° (c=2 g/100 ml dioxane) Chemical Shift Values $^1$H-NMR (CDCl$_3$/TFA 9:1): δ (ppm)=1.15 (d, 6H), 2.02–2.23 (m, 2H), 2.99 (m, 4H), 4.39 (d, 4H), 7.21 (d, 4H), 7.47 (d, 2H), 8.16 (d, 2H), 8.30 (d, 2H), 8.88 (s, 2H).

| Elemental analysis: [%] | | C | H | S |
|---|---|---|---|---|
| C$_{32}$H$_{32}$O$_6$S$_2$ | calc.: | 66.64 | 5.59 | 11.12 |
| (576.722) | found: | 66.17 | 5.51 | 11.00 |

Figure 14:
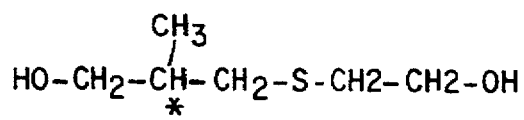

Polymer 6 was prepared using a different sulfide, referred to below for short as sulfide 2, as starting material, namely using (S)-(+)-(1-[3-hydroxy-2-methyl]-propyl)-(1-[2-hydroxy]-ethyl) sulfide, the structural formula of which is shown in FIG. 14. A possible procedure for its preparation is as follows. A solution of 150 ml of freshly distilled ethanol and 3.21 g (0.133 mol) of sodium was freed from oxygen for 20 minutes in a stream of nitrogen. 0.132 mol of 2-hydroxyethylmercaptan was added to the solution, which was stirred for 15 minutes. Subsequently 20.04 g (0.131 mol) of a halogen compound which has already been mentioned in another connection, namely (S)-(–)-3-bromo-2-methyl-1-propanol, in 20 ml of ethanol, was added to the former solution via a dropping funnel. Stirring was continued at 80° C. for two hours; 300 ml of water were added, and the mixture was concentrated in vacuo (12 mbar) to a volume of 300 ml. The remaining suspension was extracted with 1.5 liters of diethyl ether for two days in a rotary perforator. The ethereal phase was separated off and dried for two hours over magnesium sulfate, and the ether solvent was distilled off in a rotary evaporator. The crude product was fractionated in vacuo (0.01 mbar) via an air-cooled short-path distillation angle. Yield: 18.98 g (0.126 mol)= 95% of theoretical. Refractive index $n_D^{20}$: +1.5063 Optical rotation $[a]_D^{20}$: +14.6° (c=2 g/100 ml, CHCl$_3$). Enantiomeric excess (ee): 99.48% (GC). Chemical Shift Values $^1$H-NMR (CDCl$_3$/TMS): δ (ppm)=1.00 (d, 3H), 1.58–2.28 (m, 1H), 2.35–2.88 (m, 6H) 3.61 (d, 2H), 3.75 (t, 2H).

| Elemental analysis: [%] | | C | H | S |
|---|---|---|---|---|
| C$_6$H$_{14}$O$_2$S | calc.: | 47.97 | 9.39 | 21.34 |
| (150.236) | found: | 47.78 | 9.55 | 21.31 |

From the resulting polymers it was possible to produce coatings, in the form of a coat of paint on articles, the colored appearance of which can be influenced or altered by heat after application. In order to obtain a coating material, one of the polymers, preferably polymer 5, was dissolved in N,N-dimethylformamide or N-methylpyrrolidone. The solids content was about 20% by weight. The resulting coating material can be applied either by knife coating or by spraying. Following the evaporation of the solvent, which may take place at room temperature or at a higher temperature (e.g. 70° C.), a film with a thickness of about 10 μm was obtained. The setting of the desired color was effected by tempering the coated substrate on a precision hotplate. Thus, in the case of polymer 5, reflection wavelengths in the red region of the visible spectrum were set at 171° C., green reflection at 178° C., and blue reflection at 190° C. By rapid cooling, for example by removing the coated substrates from the hotplate and allowing them to cool by free convection in surrounding air (quenching) it was possible to stabilize the reflection color which had been set in each case. The material can be crosslinked by irradiating the coated specimens with UV light. For this purpose, for example, coated metal test panels were placed on the conveyor belt of a UV curing unit (DRS, UV System F 450 from Eltosch) and passed below the UV lamp at a rate of 15 m/min. After this there was no further change in the color of the coating until the material decomposes (>300° C.). Coatings produced in this way have a Vickers hardness of about 300 N/mm$^2$. For comparison, the Vickers hardness of conventional, particularly hard two-component polyurethane coating materials was about 170–180 N/mm$^2$. The color-imparting coats according to the invention are therefore not only capable of subsequent alteration in their colored appearance, i.e. following the application of the coating material, but also, simultaneously, exhibit-great hardness.

There are also other possible applications outside the coating field, which will be mentioned briefly here, however, for the sake of completeness. The high temperature of use results in the possibility of thermally structuring coats of the material (preferably polymer 5). By supplying heat (e.g. by means of CO$_2$ lasers, hot air, etc.) followed by rapid cooling, it is possible to fix information in the coating. This information may be text or may only be points. Coatings structured in this way can therefore serve as information stores and can be detected with an optically sensitive layer (optoelectronics). The storage may be reversible or, after crosslinking of the material, irreversible. A further possibility for thermal structuring is to contact a coating (preferably of polymer 5) with a forming tool which has been heated to a temperature of more than 170° and less than 200° C., which forming tool provides for greater dissipation of heat at its points of contact with the coating than the surrounding air, followed by rapid cooling, to give reflection colors having the configuration of the forming tool. For instance, it was possible to take a black metal test panel coated with polymer 5, whose reflection wavelength had been set to blue, to briefly apply a Mercedes star made of metal, and in this way to obtain an image of this star in a green reflection wavelength. Further possible applications include use as polarizers and filters in optics, nondestructive materials testing (heat flux methods), applications in nonlinear optics, and as organic substrates in electronics for fiber and film technology.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A colored coating material comprising a paint vehicle for coating articles, said paint vehicle comprising at least one curable liquid-crystal polymer having a colored appearance at least partially determined by mesogens therein which exhibit an interference effect, said mesogens being main-chain mesogens and being uncrosslinked when the coating material is applied to an article surface and not crosslinkable by heat and upon application to the article surface automatically aligning themselves approximately perpendicular to said surface and adopting a chiral-nematic configuration in which they form helixes having a pitch length which can be varied by heat, said at least one liquid-crystal polymer being a main-chain polymer comprising a chiral center, wherein the pitch length of the helix is varied by heat to adjust the color only at a temperature above the temperature at which the article to which it is applied is used and wherein the polymer is then irreversibly cross-linked by means other than heat.

2. A coating material according to claim 1, wherein the at least one liquid-crystal polymer is a polyester.

3. A coating material according to claim 1, wherein the at least one liquid-crystal polymer contains at least one dextrorotatory or levorotary polymer educt, wherein the educt consists of at least one diol and at least one dicarboxylic acid or dicarboxylic acid derivative and the diol and the dicarboxylic acid or dicarboxylic acid derivative are present in a ratio of about 1, wherein the polymer educt is selected from the group consisting of:

4-(hydroxyphenyl)-(1-[3-hydroxy-2-methyl]-propyl)-sulfide reacted with 3-(4-chloroformylphenyl) propenecarbonyl chloride, 4-(hydroxyphenyl)-(1-[3-hydroxy-2-methyl]-propyl)-sulfide reacted with 3-(4-chloroformylphenyl) propenecarbonyl chloride and with 2,6-naphthalenedicarbonyl chloride, 2,6-bis({1-[4-hydroxy-3 methyl-1-thio]-butyl}-4-phenyl) naphthoate reacted with 3-(4-chloroformylphenyl) propenecarbonyl chloride, 4-(hydroxyphenyl)-(1-[3-hydroxy-2-methyl]-propyl)-sulfide reacted with N-(4-[2-chloroformylethenyl]-phenyl) trimellitimide chloride, and (1-[3-hydroxy-2-methyl]-propyl)-(1-[2-hydroxy]-ethyl)-sulfide reacted with N-(4-[2-chloroformylethenyl]-phenyl) trimellitimide chloride.

* * * * *